Figure 1:
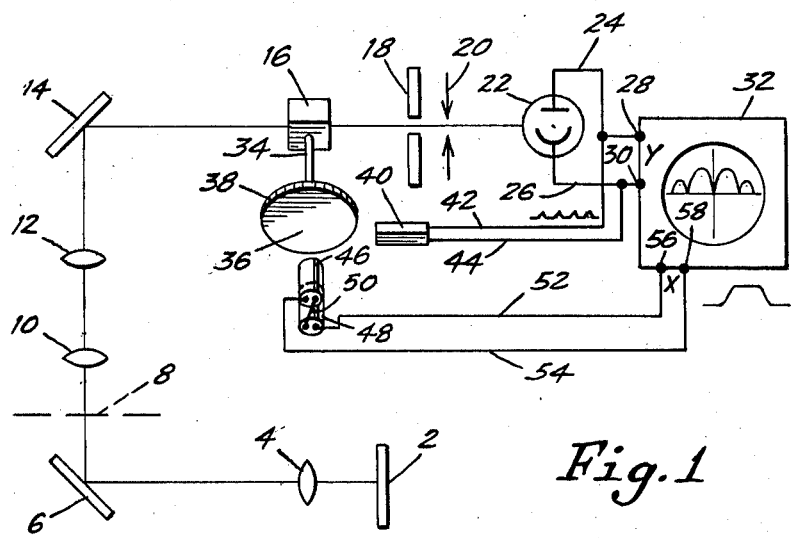

April 21, 1964  E. W. MANN  3,130,345
MEASURING DEVICE
Filed March 1, 1961  3 Sheets-Sheet 1

INVENTOR
Edward W. Mann,
BY Diggins + LeBlanc
ATTORNEYS

United States Patent Office 3,130,345
Patented Apr. 21, 1964

3,130,345
MEASURING DEVICE
Edward W. Mann, Sudbury, Mass., assignor to Geophysics Corporation of America, Boston, Mass., a corporation of Delaware
Filed Mar. 1, 1961, Ser. No. 92,637
22 Claims. (Cl. 315—19)

This invention relates to a time sweep voltage generator for photoelectric null indicators, and more particularly relates to an electromagnetic sweep voltage generator for such indicators.

Measuring comparators have in the past been provided with a number of different photoelectric setting devices or null indicators for use in the wavelength measurement of spectral lines on a photographic plate and for the measurement of the distance of lines or points from a fiducial position. One such setting device uses a rotating glass prism to scan the field of view over a slit while another device scans an image of a bright line filament over the field of view in a direction normal to the length of the filament. The resulting signals, as detected by a photo-sensitive device, are displayed synchronously on an oscilloscope in such a manner that successive sweeps by the prism are presented first left to right and then right to left on the oscilloscope screen so that successive signals are presented as mirror images. Systems have been provided to read the null indication in one coordinate or in an improved system in two coordinates. Such a two coordinate null indicator is disclosed and claimed in assignee's copending application Serial No. 65,442, filed October 27, 1960, in the name of Robert M. Chapman, now abandoned.

In systems of these types, one of the major problems encountered is the synchronization of the photoelectrically produced signal with the oscilloscope sweep signal. One of the proposed solutions of this problem entails the use of the line voltage to the synchronous motor which drives the prism as the sweep voltage. This technique, however, in some instances may result in drift difficulties, since the phasing of output and input is not constant in a synchronous motor. Another proposed solution of this problem is the use of a second optical system which includes a mask or chopper carried by the prism and a photosensitive device for sensing the amount of light passing through the chopper and producing an output signal which can be fed to the sweep terminals of the oscilloscope. This system is very satisfactory in operation but is costly and difficult to adjust for varying conditions.

According to the present invention, it has now been found that it is possible to provide a time sweep voltage generator of the electromagnetic type which is extremely accurate, simple of construction, economical and easily adjustable. The present apparatus also affords simpler and more accurate centering by enabling one image to be presented inside the other.

It is therefore a primary object of the present invention to provide an improved sweep voltage generator.

It is another object of this invention to provide a sweep voltage generator of the electromagnetic type.

It is another object of this invention to provide an electromagnetic sweep voltage generator of extereme accuracy and easy adjustability.

It is another object of this invention to provide an electromagnetic sweep voltage generator which provides sweeps of different speeds in the two sweep directions.

It is a further object of this invention to provide a system for producing marker pips to measure small displacements in the patterns as presented on the oscilloscope screen.

Figure 2:
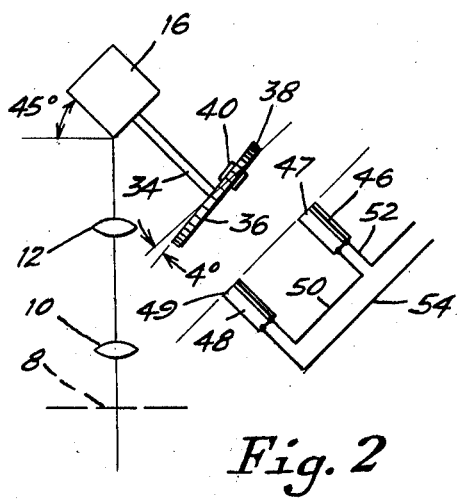
Figure 3:
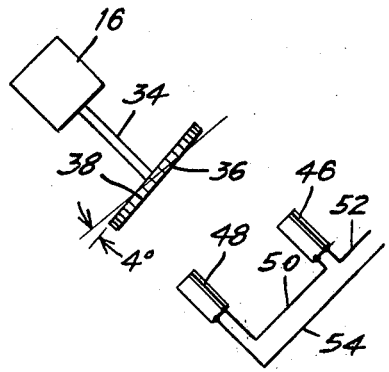
Figure 4:
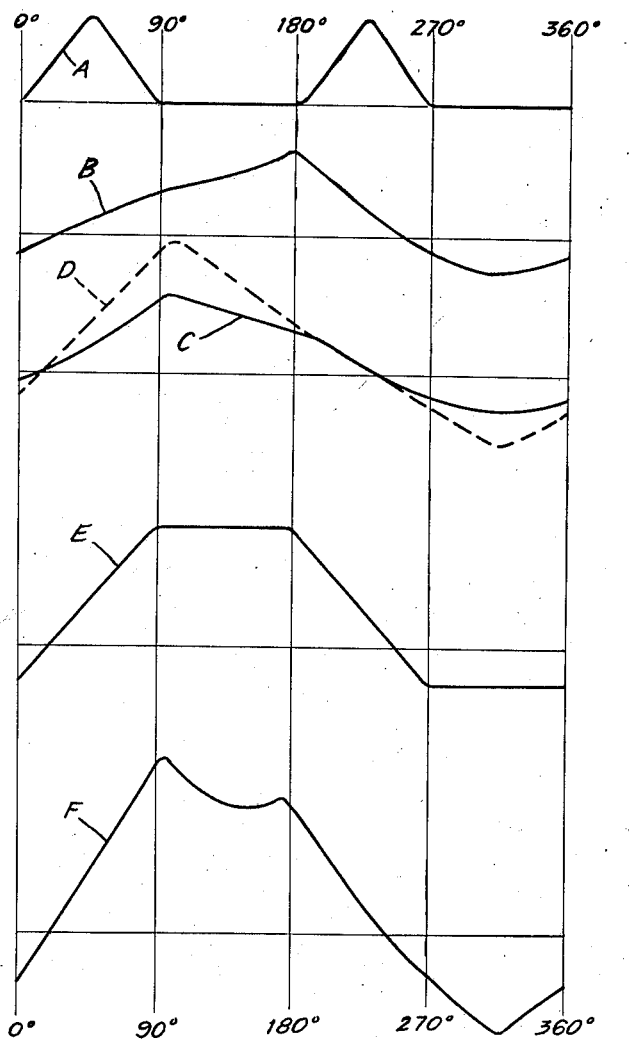
Figure 5:
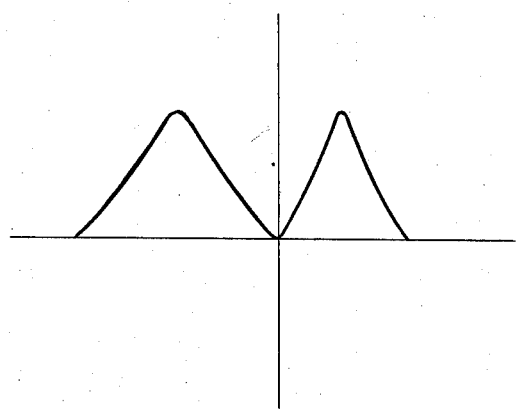
Figure 6:
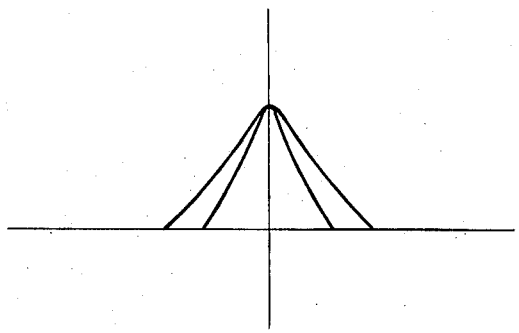
Figure 7:
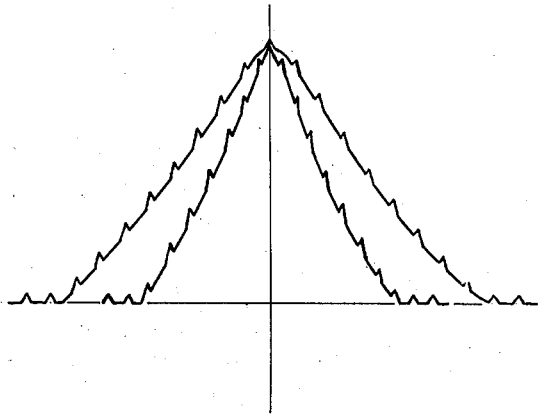

These and further objects and advantages of the invention will become more apparent upon reference to the following specification and claims and appended drawings wherein:

FIGURE 1 is a partially schematic diagram of one embodiment of the present invention;
FIGURE 2 is a partial side view of FIGURE 1;
FIGURE 3 is a modification of the system shown in FIGURES 1 and 2;
FIGURE 4 is a table of curves showing the various outputs of the components of the systems shown in FIGURES 1, 2 and 3;
FIGURE 5 is the oscilloscope trace obtained when the output signals of the photosensitive device of FIGURE 5 are off center;
FIGURE 6 is the oscilloscope trace obtained after the output signals of the photosensitive device have been centered; and
FIGURE 7 is the oscilloscope trace obtained when the output signals of the photosensitive device are centered and marker pips are superimposed on these signals.

Referring now to FIGURES 1 and 2, a two-coordinate photoelectric null indicating system is shown which is similar in many respects to that disclosed and claimed in assignee's copending application Serial No. 65,442. In this system, a tungsten filament lamp 2 casts a beam of light upon a condensing lens 4. The resulting light rays are reflected by a mirror 6 through the plate 8 and then through a pair of comparator lenses 10 and 12. A mirror 14 deflects the beam of light through a cube 16 and iris 18 onto a slit 20 as an image of the plate. A photomultiplier or other photosensitive device 22 is positioned behind the slit and senses the amount of light entering the slit. The output of the photomultiplier is connected through leads 24 and 26 to the vertical or Y terminals 28 and 30 of an oscilloscope 32. The glass cube 16 has its alternate faces blackened and is mounted for rotation on a shaft 34. The shaft may be driven by any suitable means, preferably by a synchronous motor (not shown) with a speed of 3600 r.p.m. A more complete description of this system may be found in assignee's aforementioned copending application.

A soft iron disc or wobble plate 36 is mounted on the prism driving shaft 34 at an angle of approximately 3 or 4 degrees from normal to the shaft, so that the disc wobbles when rotated. This wobble plate mounting angle is shown in exaggerated fashion in FIGURE 2.

The wobble plate 36 is provided with a plurality of serrations or teeth 38 on its outer periphery. An electromagnetic pick-up device 40 of any well known type having a linear output characteristic is located in the plane of the wobble plate or in any other suitable position to be energized by the passing of the teeth 38 of the wobble plate. The output signals from the pick-up 40 resulting from the passage of the teeth 38 are fed through leads 42 and 44 to the conductors 24 and 26 respectively, and thence to the vertical or "Y" input of the oscilloscope.

A pair of electromagnetic pick-up heads 46 and 48 are mounted with their sensing surfaces 47 and 49 located on a line normal to the prism shaft and spaced from the wobble plate 36. The electromagnetic pick-up heads 46 and 48 are connected in a series aiding circuit by the connector 50 and have their outputs fed by connectors 52 and 54 to the horizontal or "X" terminals 56 and 58 of the oscilloscope 32. The pick-up heads 46 and 48 are of any known type that give a non-linear output in response to the wobble plate approaching and receding away from them due to the oblique mounting of the plate 36 on the shaft 34. An example of such a pick-up head is the Electro Products Laboratories type 3015A electromagnetic pick-up head.

The system of FIGURE 3 is identical in all respects to that of FIGURES 1 and 2 with the exception that the pick-up head 48 is placed closer to the wobble plate 36 than is the pick-up head 46. The relative portions of these heads could, of course, be reversed. The purpose of this arrangement will be more fully described hereinafter. It should be noted that although FIGURES 1, 2 and 3 show a two-coordinate null indicating system of the type disclosed in the aforementioned copending application, the present invention may be used with equal facility in a one-coordinate null indicating device. It also has broad utility in any cathode ray tube apparatus wherein a two directional sweep voltage is desired.

Referring now to FIGURE 4, a number of curves are shown which illustrate the outputs of the various parts of the system. Curve A represents the output of the photomultiplier 22 due to the light passing through the rotating cube 16. In the interest of simplicity, only the signal resulting from one coordinate is shown in this figure. As can be seen from this curve, if the beginning of the cycle is taken to be the instant when light first is able to pass through the cube, the signal from the photomultiplier rises from and falls to zero in the first 90 degrees of rotation of the cube.

During the second 90 degrees of rotation, the blackened surfaces of the cube completely block the light beam and prevent its entering the slit and therefore there is no output from the photomultiplier. In the third 90 degrees of rotation of the cube the photomultiplier output signal again rises from and falls to zero while in the fourth 90 degrees of rotation the light is again blocked by the blackened surfaces of the cube.

Curve B represents the output of the pick-up head 46. As may be seen from this curve, the pick-up head 46 is initially positioned in relation to the wobble plate 36 so that the output signal of the pick-up head 46 is continually rising in the first quarter cycle of cube and wobble plate rotation, peaks and begins to fall in the second quarter cycle of wobble plate rotation, continually decreases in the third quarter cycle of wobble plate rotation, and reaches a minimum peak and begins to increase in the fourth quarter cycle of wobble plate rotation.

In a similar manner, the output of pick-up head 48, when positioned in the manner shown in FIGURE 2 is shown by the curve C. This pick-up head is identical to pick-up head 46, but connected 180° out of phase therewith, and connected in series aiding relationship (which in this case means that the two heads are oppositely wound). The curve C rises fairly sharply in the first quarter cycle of wobble plate rotation, reaches a peak early in the second quarter cycle, begins to decline in the second quarter cycle, continues to decrease in the third quarter cycle of rotation and reaches a minimum and begins to increase in the fourth quarter cyle of rotation.

The curve D shown in dotted lines superimposed on curve C is the output curve which is produced by the pick-up head 48 when it is placed closer to the wobble plate 36 as shown in FIGURE 3. As can be seen, placing the pick-up head closer to the wobble plate results in a curve having a greater amplitude at its peaks.

The curve E is the sum of the curves B and C and represents the combined outputs of the pick-up heads 46 and 48 when they are spaced equally distant from the wobble plate 36 and connected in series aiding relationship. As shown by this curve, the output of these pick-ups rises steadily in the first quarter cycle of cube and wobble plate rotation, remains relatively constant during the second quarter cycle of wobble plate rotation, decreases steadily in the third quarter cycle of wobble plate rotation with the same slope as it increased in the first quarter, and remains relatively constant at its minimum value in the fourth quarter cycle of wobble plate rotation.

From the curve E, it can be seen that the horizontal or "X" terminals of the oscilloscope are fed with a sweep voltage that is consistently positive going during the time that the cube passes its first light signal to the photomultiplier 22. The output of the photomultiplier is thus displaced on the oscilloscope screen from left to right. When the cube passes its second light signal to the photomultiplier, the curve E is consistently negative going and thus presents the photomultplier output signal from right to left on the oscilloscope screen. This image is then the mirror image of the first signal displayed on the scope screen. These images can then be centered as described in assignee's copending application Serial No. 65,442.

The curve F shown in FIGURE 4 is a representation of the sum of curves B and D and indicates the output signal from the pick-up heads 46 and 48 when they are positioned in the manner shown in FIGURE 3. As can be seen from this curve, the combined outputs of the pick-ups 46 and 48 again give a signal which is consistently positive going in the first quarter cycle of wobble plate rotation and consistently negative going in the third quarter cycle of wobble plate rotation. The difference between the curve F and the curve E is most readily ascertained by a comparison of the curves during the second and fourth quarter cycles of rotation of the wobble plate. As can be seen from the curve F, the amplitude of the signal decreases while the wobble plate is in the second quarter cycle of its rotation and increases when the wobble plate is in its fourth quarter cycle of rotation. The result is that the slope of the curve in the first quarter cycle of rotation is greater than the slope of the curve in the third quarter cycle. The sweep from left to right on the oscilloscope is thus faster than the sweep from right to left with the result that the signal displayed by the oscilloscope in response to the first quarter cycle output of the cube is larger, i.e., wider, than the third quarter cycle output signal.

FIGURE 5 shows the pattern displayed on the oscilloscope screen as a result of the signal represented by curve F being imposed on the horizontal terminals of the scope. FIGURE 6 shows the signals of FIGURE 5 after they have been centered. Centering is made more accurate and easier by the fact that one signal is wider than the other. The smaller signal may be centered inside the larger signal, thus eliminating the very difficult procedure of exactly superimposing the lines of each signal on top of one another which is required when these signals are of the same size.

FIGURE 7 shows the oscilloscope trace obtained when the output from the pick-up head 40 is applied to the vertical terminals of the osilloscope together with the photomultiplier output and the sweep signal shown in FIGURE 4, curve F, is applied to the horizontal terminals. The passage of the teeth 38 in the wobble plate 36 past the head 40 generates a number of marker pips which are superimposed on the other signals. The teeth 38 can be placed on the wheel or disc 36 in such a manner that each marker pip represents a certain displacement, for example, one micron. The presence of the marker pips on the oscilloscope traces is useful in measuring small displacements in the patterns as presented on the scope and thus makes adjustment of the comparator easier and more exact.

It can be seen from the above description that the present invention provides a simple, easily adjustable sweep voltage generator for a photoelectric setting device to be used with measuring comparators. The photoelectric setting device may be of either of the two types of two-coordinate null indicator described in assignee's aforementioned copending application, or in any known one-coordinate null indicator. It is to be understood that, although the invention has been described in conjunction with such null indicators, it can be used in any application where it is desired to obtain a sweep voltage for cathode ray tube apparatus that progresses first in one direction and then in the opposite direction.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced.

What is claimed and desired to be secured by United States Letters Patent is:

1. A time sweep voltage generator for cathode ray tube apparatus having a plurality of deflection plate sets, said generator comprising a shaft, means for rotating said shaft, a disc of magnetizable material mounted on said shaft for rotation therewith, said disc being mounted obliquely to the axis of said shaft, a plurality of electromagnetic pick-up heads positioned relative to said disc so that said disc during rotation approaches and recedes from each of said heads whereby signals are produced by said heads in response to rotation of said disc, and means for impressing said signals on one of said deflection plate sets.

2. A time sweep voltage generator for cathode ray tube apparatus having a plurality of deflection plate sets, said generator comprising a shaft, means for rotating said shaft, a disc of magnetizable material mounted on said shaft at an angle oblique to the axis of said shaft, a plurality of electromagnetic pick-up heads located near said disc and positioned in a plane forming an angle with said axis of said shaft other than said oblique angle whereby said disc approaches and recedes from said heads as said shaft rotates, said rotation causing said heads to produce output signals, and means for impressing said output signals on one of said deflection plate sets.

3. A time sweep voltage generator for cathode ray tube apparatus having a plurality of deflection plate sets, said generator comprising a shaft, means for rotating said shaft, a soft iron disc fixedly mounted on said shaft at an angle oblique to the axis of said shaft, a pair of electromagnetic pick-up heads positioned relative to said disc so that said disc during rotation approaches and recedes from each of said heads in a sequential manner, said heads being approximately 180° apart and being electrically connected in series aiding relationship, said rotation of said shaft and said disc causing said pick-up heads to produce output signals, and means for impressing said output signals on one of said deflection plate sets.

4. The apparatus of claim 3 wherein both of said heads are equidistant from a plane normal to said axis.

5. The apparatus of claim 3 wherein one of said heads is closer to a plane normal to said axis than the other of said heads.

6. The apparatus of claim 5 wherein said output signals produced by said pick-up heads are non-linear.

7. The apparatus of claim 6 wherein means are provided for feeding marker signals to a second deflection plate set.

8. A photoelectric setting device of the type wherein a rotating prism controls the amount of light falling on a photosensitive device whose output is fed to a first pair of input terminals of an oscilloscope, the improvement comprising a sweep voltage generator comprising a disc of magnetizable material rotating with said prism and mounted in a plane oblique to the axis of rotation of said prism, a plurality of pick-up heads positioned relative to said disc so that said disc during rotation approaches and recedes from each of said heads whereby said heads produce output signals in response to the rotation of said disc, and means for impressing said output signals on a second pair of input terminals of said oscilloscope.

9. In a photoelectric setting device of the type wherein a rotating prism controls the amount of light falling on a photosensitive device whose output is fed to a first input of an oscilloscope, the improvement comprising a sweep voltage generator comprising a soft iron disc mounted for rotation with said prism in a plane oblique to the axis of rotation of said prism, a pair of electromagnetic pick-up heads positioned relative to said disc so that said disc during rotation approaches and recedes from each of said heads, said heads producing output signals in response to the rotation of said disc, and means for feeding said output signals to a second input of said oscilloscope.

10. In a photoelectric setting device of the type wherein a rotating prism controls the amount of light falling on a photosensitive device whose output is fed to a first input of an oscilloscope having a screen, the improvement comprising a time sweep voltage generator comprising a soft iron disc mounted for rotation with said prism in a plane oblique to the axis of rotation of said prism, a pair of electromagnetic pick-up heads positioned relative to said disc so that said disc during rotation approaches and recedes from each of said heads in a sequential manner, said heads producing output signals in response to the rotation of said disc, said heads being located 180° apart and electrically connected in series aiding relationship, and means for impressing the combined output signals of said heads onto a second input of said oscilloscope.

11. The improvement of claim 10 wherein said output signals are non-linear.

12. The improvement of claim 10 wherein said oblique plane forms an angle of approximately 4 degrees with said axis of rotation.

13. The improvement of claim 11 wherein said oblique plane forms an axis of approximately 4 degrees with said axis of rotation.

14. The improvement of claim 11 wherein one of said heads is positioned closer to said disc than is the other of said heads.

15. The improvement of claim 11 wherein means are provided for producing marker pips on said oscilloscope screen.

16. A time sweep voltage generator for an oscilloscope having a screen and a plurality of inputs, comprising a rotating iron disc, a pair of electromagnetic pick-up heads positioned relative to said disc so that said disc approaches and recedes from each of said heads in a sequential manner, and means for electrically connecting said heads in series aiding relationship and to a first input of said oscilloscope.

17. The apparatus of claim 16 wherein said pick-up heads are spaced 180° from each other relative to the axis of rotation of said disc.

18. The apparatus of claim 17 wherein said electromagnetic pick-up heads have non-linear output characteristics.

19. The apparatus of claim 18 wherein one of said pick-up heads is positioned closer to said disc than the other of said pick-up heads.

20. The apparatus of claim 16 wherein means are provided for producing marker pips on said oscilloscope screen.

21. A photoelectric setting device for measuring comparators comprising in combination, a rotating prism having alternately blackened faces, a source of light, a photoelectric device, said prism by its rotation controlling the amount of light passing from the source of light to the photoelectric device, means for impressing the output of said photoelectric device on a first pair of deflection plates of a cathode ray oscilloscope whereby a series of traces are produced on the screen of said oscilloscope, and means for modifying said traces whereby each alternate trace is of different width than the preceding trace and travels in a different direction on said screen.

22. The apparatus of claim 21 whereby said modifying means comprises means for changing the direction and slope of a sweep signal impressed on a second pair of deflection plates of said oscilloscope.

References Cited in the file of this patent

UNITED STATES PATENTS

| | | |
|---|---|---|
| 2,193,606 | Ulrey | Mar. 12, 1940 |
| 2,650,307 | Koppius | Aug. 25, 1953 |
| 2,745,311 | Touvet | May 15, 1956 |
| 2,824,972 | Beitz | Feb. 25, 1958 |

UNITED STATES PATENT OFFICE
CERTIFICATE OF CORRECTION

Patent No. 3,130,345

April 21, 1964

Edward W. Mann

It is hereby certified that error appears in the above numbered patent requiring correction and that the said Letters Patent should read as corrected below.

Column 3, line 19, for "portions" read -- positions --; column 4, line 21, for "displaced" read -- displayed --; column 5, line 26, after "embraced" insert -- therein --.

Signed and sealed this 8th day of September 1964.

(SEAL)
Attest:

ERNEST W. SWIDER
Attesting Officer

EDWARD J. BRENNER
Commissioner of Patents